June 3, 1941.                C. B. SHAW                2,243,983
                            CHIP SPREADER
            Filed Oct. 10, 1936            2 Sheets-Sheet 1
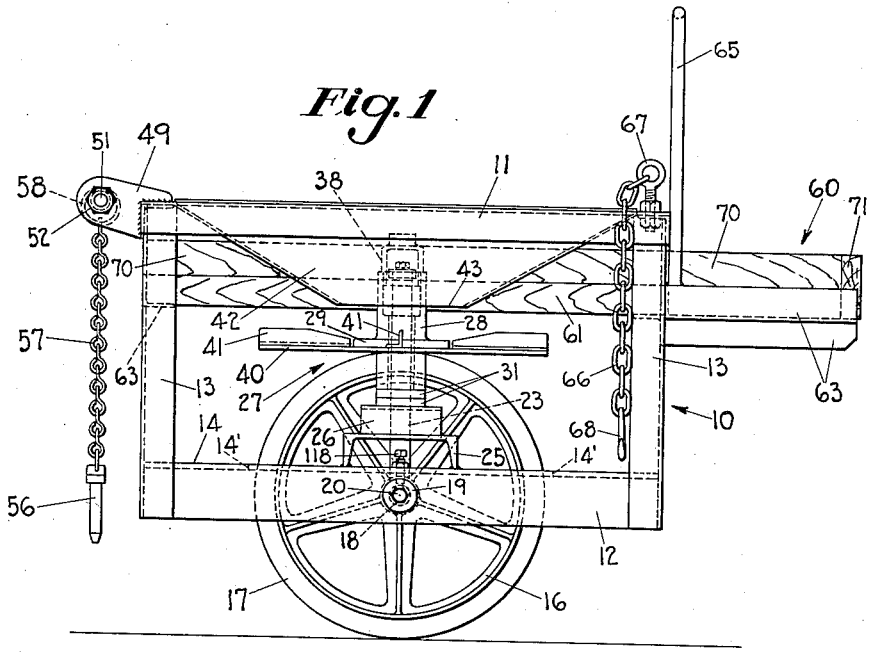
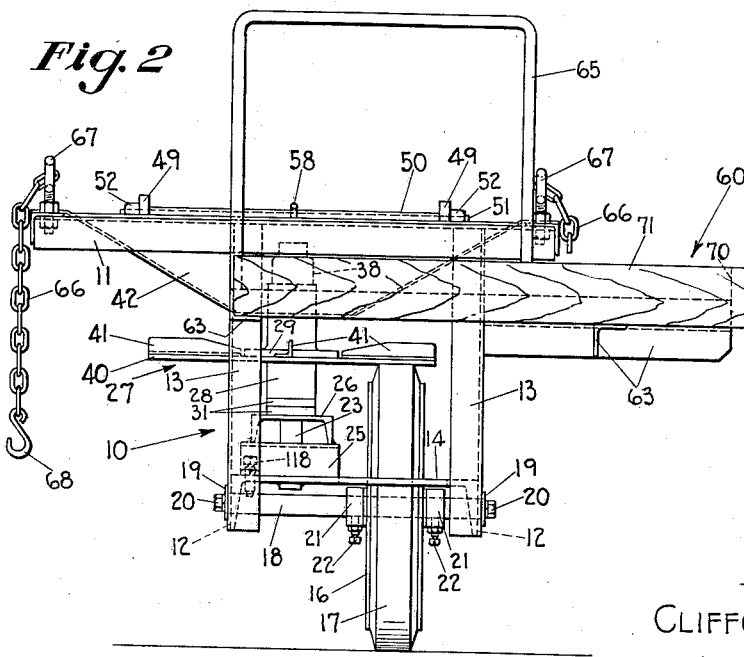
INVENTOR:
CLIFFORD B. SHAW.
By Chas. M. Nissen,
ATTY.

June 3, 1941.          C. B. SHAW          2,243,983
CHIP SPREADER
Filed Oct. 10, 1936          2 Sheets-Sheet 2
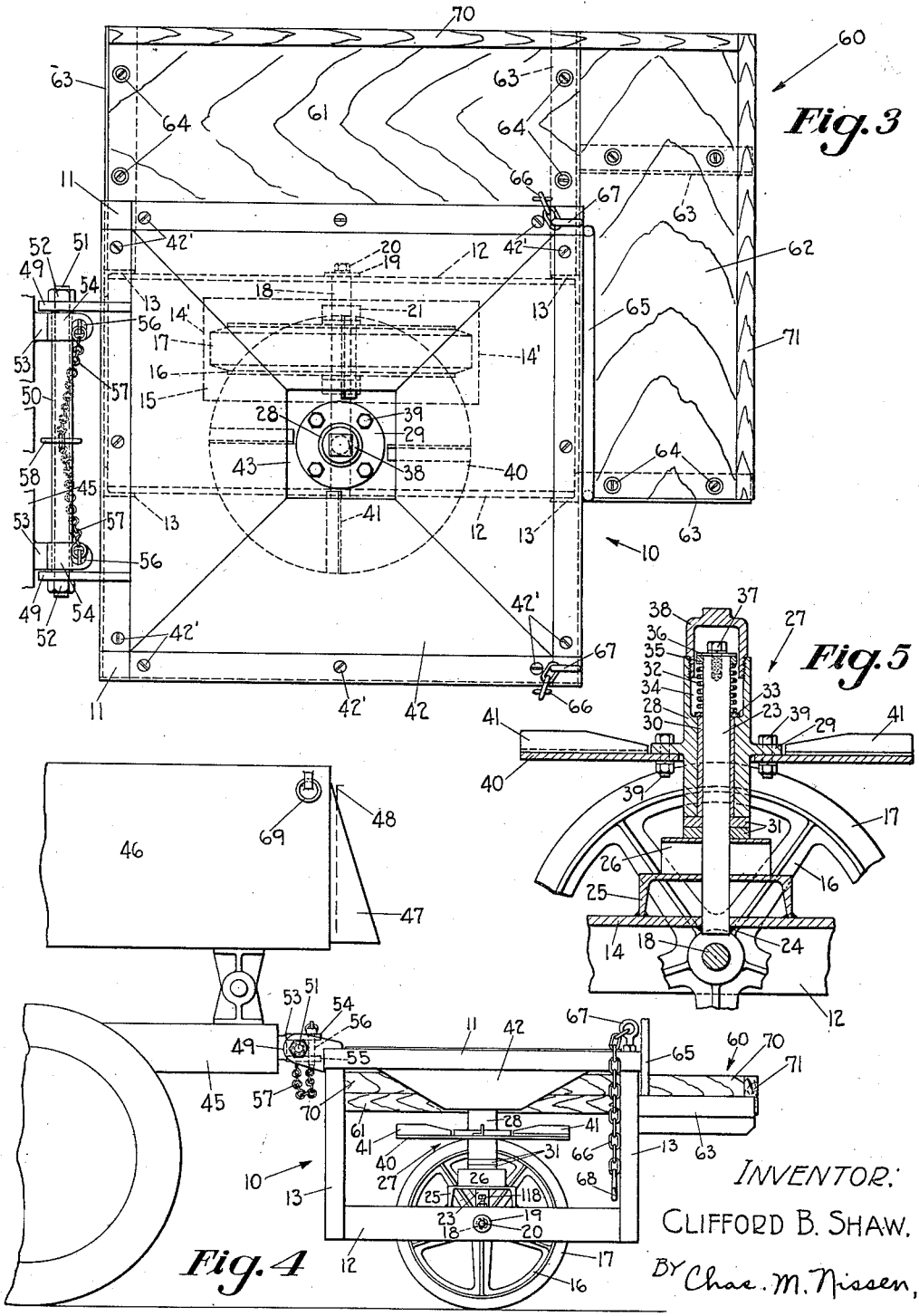
INVENTOR:
CLIFFORD B. SHAW.
BY Chas. M. Nissen,
ATTY.

Patented June 3, 1941

2,243,983

UNITED STATES PATENT OFFICE 2,243,983

CHIP SPREADER

Clifford B. Shaw, Newark, Ohio, assignor to The Galion Iron Works & Manufacturing Company, a corporation of Ohio Application October 10, 1936, Serial No. 105,055

40 Claims. (Cl. 275—8)

This device relates to a chip spreader for spreading such material as stone chips, sand or gravel or other loose granular material over a road surface.

An object of the invention is to provide a very simple, yet efficient, device of the above mentioned type, the cost of which is reduced to a minimum without the sacrifice of reliability.

Another object of the invention is to provide a chip spreader in which a supporting wheel has direct contact with a material distributing disc to rotate said disc.

Another object of the invention is to provide a simple, yet effective, means to maintain a rotating disc and an operating wheel in contacting relation at all times.

Other objects of the invention will appear hereinafter, the novel features and combinations being set forth in the appended claims.

In the accompanying drawings—

Fig. 1 is a side elevational view of the device of my invention;

Fig. 2 is an end elevational view of said device;

Fig. 3 is a plan view of said device;

Fig. 4 is a side elevational view of said device operatively attached to a truck; and Fig. 5 is an enlarged vertical sectional view showing in detail the mounting of the distributing disc.

Referring to the accompanying drawings, the chip spreader comprising my invention is formed by a frame 10 composed of top angle members 11, bottom plate members 12 and upstanding angle members 13, all of which members are rigidly attached together, as by welding.

Extending between the bottom plate members 12 and integral therewith is a bed plate 14, said plate 14 and members 12 preferably being an inverted section of channel material. Said bed plate 14 is provided with an elongated aperture 15 (see Fig. 3) within which is positioned a wheel 16 having a solid rubber tire 17 and mounted upon a transversely extending shaft 18 which is rigidly attached at its ends to the bottom plate members 12 by washers 19 and machine screws 20. Turning of shaft 18 is prevented by set screw 118 threaded in bed plate 14 (see Fig. 2).

The wheel 16 is held in adjusted position on the shaft 18 by a pair of adjustable collars 21, 21 provided with set screws 22, 22. By loosening the set screws 22, 22, the collars 21, 21 may be adjusted on the shaft 18 to adjust the wheel 16 along said shaft 18 thereby to adjust the speed ratio of the wheel 16 and the distributing disc, as hereinafter described in more detail.

Mounted upon the bed plate 14 is an upstanding shaft or bearing 23, the axis of which is at right angles with the axis of shaft 18 and intersects the axis of said shaft 18. Said upstanding bearing or shaft 23 is rigidly attached to the bed plate 14, as by welding, seen at 24, and by a pair of short channel member 25 and 26, the former of which is welded to the bed plate 14 and the latter of which is welded to the channel member 25. As clearly seen in Fig. 5 of the drawings, the channel members 25 and 26 provide a stepped base to support the shaft 23, the longitudinal axis of said channel members 25 and 26 being at right angles to each other. Said channel members 25 and 26 are provided with central apertures which have a close fit with the shaft 23 to insure rigidity of said shaft.

Mounted upon the shaft 23 for rotation thereon, is a distributor mechanism 27 comprising a hub or tubular shaft 28 having a central peripheral flange 29 and an internal journal bearing 30 which has a press fit with the hub 28 and rotates freely on the shaft 23.

Surrounding the shaft 23 and positioned between the hub 28 and the channel member 26 are a plurality of felt washers 31 which may be easily compressed. The channel 26 and washers 31 constitute a step bearing for the tubular shaft 28. Surrounding the upper end of the shaft 23 is a coil spring 32, one end of which rests upon a washer 33 which rests in the bottom of a cup 34 formed by the hub 28, and provides an appropriate bearing between the coil spring 32 and the hub 28 and journal bearing 30. The upper end of the coil spring 32 bears against a ring 35 carried by a washer 36 which is removably attached to the top of the shaft 23 by a machine screw 37, preferably provided with a lock washer. Cup 34 is provided with a lubricant.

To provide a total enclosure for the spring 32 and to prevent the accumulation of any dirt in the cup 34 which might reach the journal bearing 30, I provide a removable screw cap 38 which is threadedly attached to the hub 28.

Removably attached to the peripheral flange 29 by nuts and bolts 39 is a material distributing member in the form of a disc 40. Said disc 40 is provided on its upper surface with a plurality of radially extending blades 41 preferably formed of angle members and rigidly attached to said disc 40, as by welding. The journal bearing 30 will provide for free rotation of the distributor mechanism 27 on the shaft 23 and will also permit free axial movement of said distributor mechanism on said shaft. The coil spring 32 will operate to urge the bottom of the disc 40 into contacting engagement with the rubber tire 17 of the wheel 16. As a consequence, when the spreader is carried behind a truck with the tire 17 in engagement with the road surface, the disc 40 will rotate under the direct influence of the wheel 16. It is thus to be seen that the wheel 16 performs a double function of supporting the spreader and of rotating the disc 40 by direct engagement therewith. The rubber tire 17 plays an important part in this operation because it not only provides for a cushioning for the distributor, but, due to the high co-efficient of friction between rubber and iron, there will be no slippage whatever of the disc 40. That is, the rubber tire 17 will insure rotation of the disc 40 whenever the wheel 16 rotates. The spring 32 will, of course, maintain the disc 40 and rubber tire 17 in engagement at all times to insure this operation. The felt washers 31 may be compressed or expanded to accommodate any position of the hub 28 encountered in practice.

Positioned adjacent the top of the frame 10 and carried by the angle members 11 is a hopper 42 having sloping sides leading to a discharge opening 43 through which the hub 28 projects. It will thus be evident that the hopper 42 will direct material which is received thereby to the center of the distributor mechanism 27 by which it will be distributed laterally of the disc 40 during rotation of the latter.

It will, of course, be obvious that, due to the fact that the chip spreader has only a single wheel 16, it is, of itself, unstable. In the operation of the device, said spreader will be attached to a truck, which truck is of the self-propelled, self-contained type, including a main chassis frame 45 and a pivotally attached material supporting body 46, which body 46 is provided with a material discharging end chute 47 which is controlled by a gate 48.

To lend stability to the chip spreader, I provide at the forward end thereof a pair of spaced brackets 49, 49 between which extends a pipe 50 which is rigidly attached thereto by a threaded rod 51 provided with removable nuts 52. The end cross-piece of the chassis 45 of the truck is provided with a pair of spaced drawbar attachments or clevices 53 adapted to receive the ends of the pipe 50 between upper and lower fingers 54 and 55. To retain the ends of the pipe 50 between the fingers 54 and 55, said fingers 54 and 55 are provided with aligned apertures adapted to receive lock pins 56 carried by chains 57 attached to the pipe 50, as by a ring 58. It will be evident that there will be two of the lock pins 56 and chains 57 on one ring 58, one pin and chain for each of the clevices 53.

To provide for the support of an operator who may operate the gate 48 and watch the operation of the chip spreader, I provide a platform 60 formed by a board 61 having an edge rail 70 and positioned along one side of the frame 10, and a board 62 having an edge rail 71 and positioned along a portion of the rear end thereof. The boards 61 and 62 are supported by angle members 63 which are rigidly attached to the frame 10 and form a part thereof. The boards 61 and 62 are preferably removably attached to said angle members 63 as by screws 64.

To aid the operator to support himself upon the platform 60, I also provide a hand rail 65 in the form of a U-shaped rod which is rigidly attached to the rear end of the frame 10, as by welding.

To provide for the transportation of the chip spreader, a chain 66 is provided at each rear corner of the frame 10 and attached thereto by an eye bolt 67, the end of each of said chains having a hook 68 adapted to engage a ring 69 adjacent each side at the rear end of the body 46 of the truck. That is, there will be a ring 69 adjacent each side at the rear end of the truck body 46 adapted to receive one of the hooks 68 of the chains 66. By swinging the spreader about the pivot formed by the pipe 50 and the clevices 53, the entire spreader may be lifted off the ground and held in transporting position by the chains 66.

In the operation of the device comprising my invention, the spreader will be attached to a self-propelled individually operated truck, preferably of the dump type, having a material carrying and discharging body 46 which may be tilted to discharge material from the chute 47, as controlled by the gate 48, into the hopper 42 of the chip spreader, which is positioned directly behind said chute 47. While the truck is discharging material with the body in a tilted position, an operator will preferably stand upon the platform 60 and control the discharge of material from said truck to the hopper 42 by controlling the gate 48. The material received by the hopper 42 will be guided through the opening 43 thereof onto the disc 40. As the truck moves forwardly or rearwardly, as determined by its operator, the ground engaging wheel 16 will rotate and this rotary movement will be transmitted directly to the disc 40 through the rubber tire 17, which has a high co-efficient of friction, thus insuring a complete lack of slipping between said tire 17 and the disc 40. The consequent rotary motion of the disc 40 will, through centrifugal force, throw the received material, such as rock chips or gravel, laterally and radially of said disc 40 to distribute it evenly on the road surface. The coil spring 32 will be effective to urge the lower surface of the disc 40 in contacting engagement with the rubber tire 17 at all times. It may be mentioned that the rubber tire 17 is illustrated as a solid tire, but a pneumatic tire may be employed if desired.

In order to adjust the speed ratio between the disc 40 and the wheel 16, said wheel 16 is adjustable on its shaft or axle 18 toward and from the axis of rotation of the disc 40, which is the axis of the shaft 23. It will be evident that as the wheel 16 is brought nearer the axis of the shaft 23, the disc 40 will rotate faster for an equivalent rotation of the wheel 16, and when the wheel 16 is moved away from said axis of rotation of the disc 40, said disc 40 will rotate at a slower speed with respect to the speed of rotation of said wheel 16.

It is also to be noted that due to the direct engagement of tire 17 and the disc 40, there is a complete absence of complicated and costly gears included in the drive train for the disc 40. As a consequence, the device is extremely simple and inexpensive, yet its efficiency is not impaired in any respect. In fact, due to the simplicity of construction, its efficiency is increased as there are practically no parts to become worn or get out of order.

The inner edges 14', 14', of the plates 14, 14, may be located closely adjacent to the periphery of the ground engaging tire 17 so as to act as scrapers to remove such road material as may cling to such tire as it moves upwardly while rotating in either direction.

Inasmuch as the hopper 42 may be removably secured to the frame by means of the screws shown at 42', 42' in Fig. 3, the rotary spreader shown in Fig. 5 becomes accessible for removal and replacement with spreader discs having radial fins but adapted to the particular material to be treated.

It should also be noted that while the operator is on the rear platform 62 he may stand directly back of the ground engaging wheel 16, 17, as viewed in Fig. 3, to assist in stabilizing the trailer spreader attachment, but by reason of the elongated pivotal bearing afforded by the pipe 50 and pivot shaft 51 as shown in Fig. 3, the operator may also stand on the side platform 61 when operating the gate 48 at the rear end of the body of the self-propelled dumping truck, with the assurance that such elongated pivotal connection will co-operate with the single ground engaging wheel 16, 17 to stabilize the upright position of the spreader during operation. This elongated pivotal connection between the frame of the spreader and the chassis frame 45 of the dumping truck, also coacts with the side supporting chains 66, 66, to prevent undue vibration of the spreader during transportation.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. In a spreading apparatus for road material, the combination with a frame, of a material spreading member mounted thereon for rotation in a substantially horizontal plane, a supporting wheel for said frame mounted for rotation on a horizontal axis, said wheel having a rubber tire thereon which contacts said member to rotate it in unison with the rotation of said wheel.

2. In a spreading apparatus for road material, the combination with a frame, of a flat material distributing disc carried by said frame and mounted for rotation on an axis perpendicular to the plane thereof, and a ground engaging wheel for supporting said frame and directly engaging said disc for rotation thereof.

3. In a material spreader, the combination with a frame, of a flat faced distributing member mounted thereon to lie in a substantially horizontal plane and rotate in said plane, a ground engaging wheel mounted for adjustment toward and from the axis of rotation of said member, said wheel engaging said member to cause rotation thereof whenever said wheel is rotated and at variable ratios of speed rotation.

4. In a material spreader, the combination with a frame, of a rotary spreading device mounted on said frame for rotation on an upright axis, a ground engaging wheel having a direct frictional driving connection with the underside of said rotary spreading device, and means comprising a spring for yieldingly maintaining the frictional driving connection between said ground engaging wheel and the underside of said rotary spreading device.

5. In a material spreader, the combination with a frame, of a material distributing device comprising a plate mounted on said frame for rotation relatively thereto on an upright axis, and a ground engaging wheel mounted on said frame with its periphery in frictional engagement with the underside of said plate to rotate the same.

6. In a material spreader, the combination with a frame, of a bearing carried thereby, a material distributing device having a hub journaled on said bearing, a ground engaging wheel in frictional driving engagement with said distributing device, a housing on said hub, means comprising a spring in said housing for urging said distributing device into frictional engagement with said wheel, and a removable closure for said housing.

7. In a spreader, the combination with a frame, of a hopper having a bottom discharge opening, a material spreader positioned below said hopper to receive material from said discharge opening, a ground engaging wheel mounted in said frame in frictional driving engagement with the lower surface of said spreader, and means affording adjustment of said wheel relative to said spreader to vary the speed ratio between the wheel and the spreader.

8. In a spreader, the combination with a frame, of a horizontal spreading device carried thereby on a vertical axis, and toothless driving means for said spreading device comprising a ground engaging frame supporting wheel in direct frictional contact with the underside of said spreading device.

9. In a road material spreader, the combination with a frame, of a ground engaging wheel for supporting said frame for towing behind a dumping truck, a hopper for receiving material dumped from the truck, a rotary distributor under a discharge opening in the bottom of said hopper and in frictional engagement with said wheel, and a cross-piece on said frame having an edge in close proximity to said wheel in position to scrape adhering material therefrom.

10. A road material spreader comprising a frame, an upright shaft bearing rigidly secured at its lower end to said frame, reinforcing channel iron sections secured rigidly to said frame and to each other and having vertically aligned openings to receive the said upright shaft and hold the latter in fixed relation to said frame, a rotary spreader journaled on said shaft bearing, and a ground engaging wheel connected to said spreader to drive the same.

11. In a road material spreader, the combination with a frame, of a ground engaging wheel for supporting the same, a rotary distributor removably mounted in said frame with its underside in frictional driving engagement with the periphery of said ground engaging wheel, a hopper carried by said frame with its discharge opening above said rotary spreader, and means for detachably connecting said frame to a hauling vehicle.

12. In a road material spreader, the combination with a frame, of an upright bearing shaft secured to said frame, a rotary spreading device comprising a hub having a ring collar thereon and a disc removably secured to the ring collar on said hub, the lower side of said disc being flat and the upper side being provided with spaced radial spreading fins, a ground engaging wheel mechanism connecting said wheel to said frame in position for its periphery to frictionally engage the flat bottom of the disc, a hopper removably connected to said frame and having a discharge opening concentric with the axis of rotation of said rotary spreading device, and means for detachably connecting said frame to a dumping truck provided with means for delivering material from the body thereof to said hopper while said wheel is in frictional driving engagement with the flat bottom of said disc to effect rotation of the latter during travel of the truck.

13. A material spreading assembly comprising a rotary distributor comprising a hub, a supporting frame, an upstanding shaft bearing secured to said frame, a cup at the top of said hub to contain lubricant for said bearing, said hub being journaled on said bearing, means comprising a spring between the upper end of said bearing and the bottom of said cup for yieldingly urging said hub toward said frame, and a closure for said cup.

14. In a material spreader, the combination with a frame, of a hopper having a discharge opening in its bottom, a rotary distributor mounted in said frame below said discharge opening for rotation on an upright axis and limited up and down bodily movement relatively to said frame, a ground engaging wheel with its periphery in direct frictional driving connection with the said rotary distributor, and means comprising a spring for yieldingly maintaining the frictional driving connection between said ground engaging wheel and said distributor.

15. In a material spreader adapted to be connected to and hauled behind a dumping truck, the combination with a frame, of a hopper in the upper portion of said frame in position to receive material from the dumping truck, said hopper having a discharge opening in its bottom, a rotary distributor, a ground engaging wheel connected to said frame for axial adjustment relative thereto and for direct frictional driving engagement of its periphery with said rotary distributor, means for mounting said distributor in said frame below said discharge opening for rotation on an upright axis and bodily up and down movement relatively to said frame, and a spring co-related with said mounting means to yieldingly maintain the frictional driving engagement between the periphery of said ground engaging wheel and said rotary distributor.

16. In a material spreader, the combination with a frame, of a material spreading device carried thereby for rotation relatively thereto, a ground engaging wheel, and mechanism adjustably connecting said ground engaging wheel to said spreading device to drive the same at varying speeds, said ground engaging wheel being connected to said frame to support the same and for adjustment relative to said spreading device to vary the driving speed ratio between said wheel and said spreading device.

17. In a material spreader, the combination with a frame, of a hopper having a discharge opening in its bottom, a rotary distributor carried by said frame below said discharge opening for rotation on an upright axis and limited up and down bodily movement relatively to said frame, said rotary distributor having a hub, an upstanding shaft bearing, said hub being journaled on said shaft bearing, a ground engaging wheel with its periphery in direct frictional driving connection with said rotary distributor, and resilient means for yieldingly maintaining the frictional driving connection between said ground engaging wheel and said distributor.

18. In a material spreader, the combination with a supporting frame, of a hopper having a discharge opening in its bottom, a rotary distributor beneath said discharge opening, a shaft bearing carried by said frame, said distributor having a hub journaled on said shaft bearing, a ground engaging wheel with its periphery in direct frictional engagement with said rotary distributor, and resilient means for urging said rotary distributor against the periphery of said ground engaging wheel.

19. In a material spreader, the combination with a frame, of a supporting wheel for said frame, a material distributing member mounted on said frame for rotation relatively thereto on an upright axis, the periphery of said supporting wheel having direct driving engagement with said member to cause their rotation in unison, and means for guiding material to said member to be distributed.

20. In a material spreader, the combination with a supporting frame, of a rotary spreader mounted thereon, a shaft bearing, mechanism for securing said shaft bearing rigidly to said frame, a ground engaging wheel journaled on said shaft bearing with its periphery in driving engagement with the underside of said rotary spreader, collars slidable along said shaft bearing on opposite sides of said ground engaging wheel, and set screws for securing said collars to said shaft bearing to confine said ground engaging wheel to a predetermined position relatively to said rotary spreader and thereby predetermine the speed ratio between said wheel and said spreader.

21. A road material spreader comprising a supporting frame, an upright bearing shaft rigidly secured to said frame to project upwardly therefrom, a rotary spreading device, means for journaling said rotary spreading device on said upright bearing shaft to move bodily up and down with said frame, a ground engaging wheel having its periphery frictionally connected to the underside of said spreading device to drive the same, and resilient means to effect maintenance of the driving connection between said wheel and said spreading device.

22. In a material spreader, the combination with a supporting frame, of a rotary spreading device mounted on said frame to move bodily therewith and for rotation relatively to said frame on an upright axis, a ground engaging wheel mounted on said frame in position to frictionally engage the underside of said spreading device to effect driving thereof when said ground engaging wheel is rotated by travel along the ground surface, and means for yieldingly maintaining frictional driving connection between said ground engaging wheel and said rotary spreading device.

23. In a material spreader, the combination with supporting framework, of a ground engaging wheel mounted thereon, a rotary distributor having its underside directly in driving engagement with the periphery of said wheel, and means comprising a spring to yieldingly hold such distributor in such driving engagement.

24. In a material spreader, the combination with a frame, of a ground engaging wheel for supporting the same, a spreader disc, mechanism mounting said spreader disc on said frame to rest on the periphery of said wheel to be driven thereby for rotation relatively to said frame, and mechanism affording adjustment of said wheel relative to said disc to vary the distance from the axis of rotation thereof to the circle of driving contact between the disc and the wheel periphery and thereby control the spreading action of the disc.

25. In a material spreader, the combination with a frame, of a hopper having a discharge opening in its bottom, a rotary spreader associated with said discharge opening and carried by said frame for rotation on an upright axis and for limited up and down bodily movement relatively to said frame, said rotary spreader having a hub, an upstanding shaft bearing, said hub being journaled on said shaft bearing, a ground engaging wheel with its periphery in direct frictional driving connection with the underside of said rotary spreader, and resilient means for yieldingly maintaining such frictional driving connection between said ground engaging wheel and said rotary spreader.

26. In a material spreader, the combination with a frame, of an upstanding shaft bearing thereon, a rotary distributor comprising a hub journaled on said shaft bearing, releasable means comprising a spring for yieldingly holding the hub on said shaft bearing, and an enclosure adapted to be opened to render said holding means accessible for release of the same to enable said hub to be withdrawn from said shaft bearing.

27. In a material spreader, the combination with a frame, of a shaft bearing mounted thereon, a rotary distributor comprising a hub journaled to said shaft bearing, releasable mechanism between the hub and shaft bearing for yieldingly holding the hub against sliding off said shaft bearing, and means comprising a cap for enclosing said releasable mechanism, said cap being detachable to render said holding mechanism accessible for release and removal of said hub from said shaft bearing.

28. In a material spreader, the combination with a frame, of an upstanding shaft bearing thereon, a rotary distributor comprising a hub journaled on said shaft bearing, a compression spring surrounding the upper end portion of said shaft bearing, means carried by said hub for supporting the lower end of said spring, and abutment mechanism secured to said shaft bearing and engaging the upper end of said spring, the spring and abutment mechanism serving to afford limited sliding movements of said hub up and down along said shaft bearing.

29. A material distributor assembly comprising a rotary distributor plate, a hub secured to said plate, a support, an upstanding shaft secured to said support, said hub being journaled on said shaft, means comprising a spring for yieldingly limiting the movement of said hub axially of said shaft, and an enclosure for said spring, said enclosure serving also as a lubricant chamber.

30. A material distributor assembly comprising a rotary distributor plate, a bearing shaft, a hub secured to said plate and journaled on said bearing, and mechanism comprising a spring between one end of said bearing shaft and said hub to slide the latter axially of said shaft.

31. In a road material spreader, the combination with supporting framework, of a ground engaging wheel, a rotary spreading device carried by said framework and having a lower surface in frictional driving engagement with the periphery of said wheel, a supporting bearing, a hub for journaling said spreading device on said supporting bearing, an enclosure at one end of said hub, and means comprising a spring within said enclosure and acting between one end of said bearing and said hub to yieldingly press the said lower surface of said spreading device against the periphery of said wheel.

32. A spreading machine comprising supporting framework, an upright shaft mounted thereon, a rotary distributor having a hub, a step bearing for one end of said hub, and mechanism comprising a spring between said shaft and said hub for yieldingly urging said hub toward said step bearing.

33. A material spreader assembly comprising a rotary distributor, a frame, a shaft bearing on said frame, a tubular enclosure for said shaft between the latter and said distributor, a ground engaging wheel connected to said frame with its periphery in driving engagement with said rotary distributor, and means comprising a spring in one end portion of said enclosure for yieldingly urging said distributor against said periphery.

34. In a material spreader, the combination with supporting framework, of a material spreading device mounted on said framework for rotation relatively thereto on an upright axis, a bearing secured to said framework, a ground engaging wheel journaled on said bearing in position to frictionally engage said spreading device to drive the same as said wheel travels along the ground surface, abutments on said bearing at opposite sides of said wheel, and means for securing said abutments to said bearing in adjusted positions to confine said wheel to rotate at a predetermined distance from the axis of rotation of said spreading device.

35. A material spreader assembly comprising a rotary distributor having a hub, a supporting frame, an upstanding shaft bearing secured to said frame, a cup-shaped extension from the upper end of said hub to afford a lubricant chamber, said hub being journaled on said shaft bearing, a closure for said lubricant chamber, and a ground engaging wheel connected to said frame to support the same with the periphery of said wheel in direct frictional driving engagement with said rotary distributor.

36. In a spreader, the combination with a supporting frame, of a ground engaging wheel, a spreader device resting on and driven by said wheel, and means for connecting said wheel to said frame for adjustment of the wheel relative to said spreader device and holding said wheel in adjusted position relative to the frame and relative to said spreader device.

37. In a material spreader, the combination with supporting framework, of a ground engaging wheel, a material spreading device mounted on said framework for rotation relatively thereto on an upright axis, means comprising a journal bearing for connecting said wheel to said framework with the periphery of said wheel in driving engagement with said spreading device, and mechanism for confining the rotation of said wheel on said journal bearing to an adjusted position relative to said framework for a predetermined driving speed ratio between said wheel and said spreading device.

38. In a device of the class described, the combination with a frame, of mechanism comprising a ground engaging wheel supporting said frame, a spreader disc in frictional driving engagement with the periphery of said ground engaging wheel, and means affording adjustment of said wheel relative to said disc and the confining of said wheel in adjusted position to rotate in predetermined relation to said disc thereby enabling the spread action of said disc to be controlled.

39. In a material spreader, the combination with a frame, of a ground engaging wheel for supporting the same, a spreader device mounted on said frame to rest on the periphery of said wheel to be driven thereby for rotation relatively to said frame, and mechanism affording adjustment of the relative positions of said spreader device and wheel to effect control of the spreading action of said disc.

40. In a spreader, the combination with a supporting frame, of a hopper mounted thereon having a bottom discharge opening, a rotary spreader mounted below said bottom discharge opening for rotation on an upright axis, a ground engaging wheel, an axle on which said ground engaging wheel is journaled, mechanism for removably securing said axle to said frame in fixed relation thereto, and abutment mechanism on said axle at opposite sides of said wheel to confine the latter to rotation in predetermined relation to said rotary spreader for a predetermined speed ratio between the wheel and the spreader.

CLIFFORD B. SHAW.